United States Patent [19]

Turpin et al.

[11] 4,416,294

[45] Nov. 22, 1983

[54] LEAF STRIPPER

[76] Inventors: Raymond L. Turpin, 146 W. Chrystal St., Dover, N.J. 07801; William K. Medford, RD 1 Box 306, Clyde, N.C. 28721

[21] Appl. No.: 411,014

[22] Filed: Aug. 24, 1982

[51] Int. Cl.³ .......................... A01P 45/16; B26D 1/00
[52] U.S. Cl. .................................... 130/30 R; 56/27.5; 83/697; 83/733
[58] Field of Search ...................... 56/27.5; 130/30 R; 131/313, 314, 319, 320, 322, 323; 83/697, 694, 411 R, 733

[56] References Cited

U.S. PATENT DOCUMENTS

| | | | |
|---|---|---|---|
| 1,772,014 | 8/1930 | Phillips | 131/323 |
| 1,787,967 | 1/1931 | Zeun | 131/323 |
| 3,077,985 | 2/1963 | Anderson | 131/313 |
| 4,350,172 | 9/1982 | Guthie | 130/30 R |
| 4,373,323 | 2/1983 | Jones | 56/27.5 |

FOREIGN PATENT DOCUMENTS 2448301 10/1980 France ........................... 130/30 R Primary Examiner—Robert P. Swiatek
Assistant Examiner—John Weiss
Attorney, Agent, or Firm—Victor J. Evans & Co.

[57] ABSTRACT

A leaf stripping machine for tobacco and the like which consists of a framework with a large pinwheel rotatably mounted on a vertical plane at one end of the framework and a stripping implement with a V-groove mounted on a track oriented perpendicular to the plane of the pinwheel. A plurality of tines project horizontally from the face of the pinwheel near its perimeter so that the stock of a tobacco plant or the like can be skewered thereupon. After securing a plurality of plants on the tines, the pinwheel is rotated to position each plant one after another to engage the stripper. When the stripper is driven forward its V-groove defoliates the stalk. When the swath of tobacco is removed, then the stripper operator extracts the stalk from the pin and places it on a pile at the back end of the machine. The pinwheel is then rotated and the operation repeated.

10 Claims, 4 Drawing Figures

LEAF STRIPPER

BACKGROUND OF THE INVENTION

The present invention relates generally to mechanical plant defoliaters and more particularly to an apparatus for stripping the leaves from tobacco plants particularly burley tobacco.

The tobacco plant is an annual and a member of the solanaceae family. The plant may attain heights of 6 feet or more. The leaves are alternate simple and rather large and, like the stem, hirsute. The stalk of the plant is straight and rather rigid and oftentimes is hollow near its base. The leaves are spaced spirally about the stalk and often droop under their own weight. Because most tobacco ripens in stages from the bottom leaves up, it often requires multiple harvesting. However, certain types of tobacco are harvested by cutting down the entire stalk and impaling it on a steel-tipped stick to be left in the field for about six days of sunshine. The leaves will blister and turn a yellow color and wilt, thus they become easier to handle in the curing barn. The above method of harvesting is called "stalk cutting". The whole assemblage of the stick with six stalks thereon are transported to a curing barn, where the stalks are hung upside down from the stick. The burley is air dried under natural conditions. When the tobacco is fully aged, the leaves are dry and crumble at the touch. At the end of the tobacco season, mother nature lends a hand by providing days of rain and fog. This moisture laden air travels into the barns, thus permeates the tobacco leaves, which are then soft and pliable. At this time the tobacco is in case and ready to be worked. The stripping process is a particularly odious task, because of the gummy nature of the leaves. This fact evidences a strong felt need for the apparatus according to the instant invention which eliminates much manual contact.

The following patents reflect the state of the art of which applicant is aware in so far as these patents appear to be germane to the patent process:

U.S. Pat. No. 2,564,614 Sowers U.S. Pat. No. 3,834,137 Long U.S. Pat. No. 3,962,850 Moore U.S. Pat. No. 4,176,510 Griner et al.

The patent to Moore and the patent to Long both teach the use of rotating blades which impact the leaves of the tobacco plant and thereby strip them from the plant.

The patent to Griner et al. teaches the use of a similar apparatus only the blades are hydraulically driven and coordinated with an endless belt. The instant invention is distinguished in that it strips the leaves from the plant after the plant has been harvested in tact. Furthermore, leaves are not removed by impact which may damage the leaf. The leaves are stripped from the stalk by a carriage employing a V-shaped groove and an indexing system is provided which allows successive stalks to be worked on so as to provide a continuous operation.

SUMMARY AND OBJECTS OF THE INVENTION

Accordingly, it is a primary object of the present invention to provide a tobacco leaf stripper which allows the operator to avoid contact with the tobacco leaf directly so that the gummy resin contained on the surface of the leaves does not get on his hands, clothing and body.

Another object of the present invention is to provide a tobacco leaf stripper which strips all the leaves from a single tobacco plant in one swift stroke, thus saving time and energy.

Still another object of the present invention is to provide a tobacco leaf stripper which accepts and mounts a plurality of tobacco plants and then rotates them into stripping position one at a time.

A still further object of the present invention is to provide a tobacco leaf stripper which is durable, economical to produce, and lends itself well to mass production techniques.

The objects stated above and other related objects are accomplished by the provision of a frame with a rotatable pinwheel vertically disposed at one end thereof and a carriage with a V-shaped stripping groove which runs on a track provided in the frame. The pinwheel contains a plurality of tines upon which tobacco stalks are mounted. The pinwheel is rotated so that each successive stalk is positioned to be engaged by the stripping carriage as it is driven forward. The V-shaped groove in the carriage captures the tobacco leaves and strips them from the stalk.

BRIEF DESCRIPTION OF THE DRAWING FIGURES

DESCRIPTION OF THE PREFERRED EMBODIMENT

Figure 1:
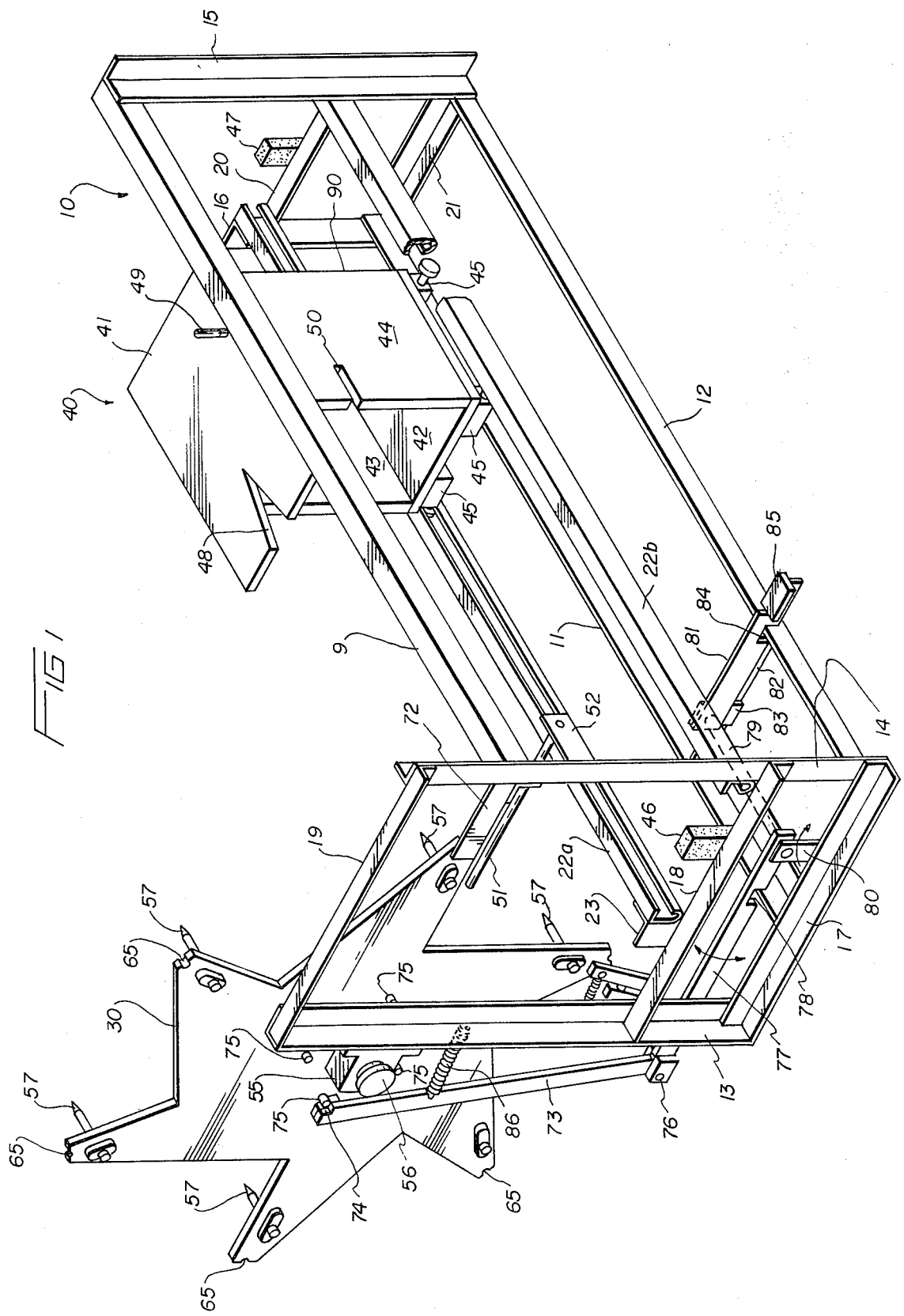
FIG. 1 is a perspective view showing the pinwheel, the frame and the stripping carriage.

Referring now to the drawings in detail wherein like reference numerals represent like parts throughout the several figures, reference numeral 10, FIG. 1 refers generally to the frame of the apparatus which is constructed from angle irons.

Bottom support angle irons 11 and 12 provide a foundation for the four vertical corner supports 13, 14, 15 and 16. Three cross-brace angle irons 17, 18 and 19 form a support web for the end of the frame 10 that supports a pinwheel 30. The opposite end of the frame 10 has two cross-braces 20 and 21 to form a second support web. Two C-shaped tracks 22a and 22b run horizontally the entire length of the frame 10 at a spaced distance apart the open side of each track facing the other. At one end of the frame 10, the tracks 22a and 22b are welded to the vertical corner support 15 and 16, and at the other end of the frame, track 22b is welded to the vertical corner support 14 and track 22a is welded to a special mounting angle iron 23 which in turn is welded to cross-support web 18. A single top support angle iron 9 extends between vertical cross-braces 14, 15 for further rigidification.

The stripping carriage generally referred to by reference numeral 40 consists of a top wall 41, a bottom wall 42, two side walls 43 and 44, and a back wall 90. The front of the carriage 40 is open. On the bottom of the carriage 42 are preferably four wheel assemblies 45 which are engaged by the tracks 22a and 22b so that the stripping carriage 40 is slidably disposed on the frame 10. Two flexible stops 46 and 47 appear at either end of the frame 10 on the support webs to stop the carriage 40 when its at either end of the frame 10. The top 41 of the stripping carriage 40 has a V-shaped groove 48 which performs the actual stripping of the tobacco leaves. The carriage 40 has a handle 49 on the top 41 to aid in manual operation of the stripping carriage 40. A notch 50 in the side wall 44 is adapted to register into a leaf drag bar 51 mounted on the vertical corner support 14 of the frame by a mounting tab 52 welded to the vertical support 14. When the stripping carriage 40 is at the end of the frame 10 closest to the pinwheel 30, the leaf drag bar 51 enters the notch 50 in the side of the carriage 44 thereby forcibly retaining the tobacco leaves that have been captured in the groove 48 of the stripping carriage 40 therein so that the operator can remove them easily.

Figure 2:
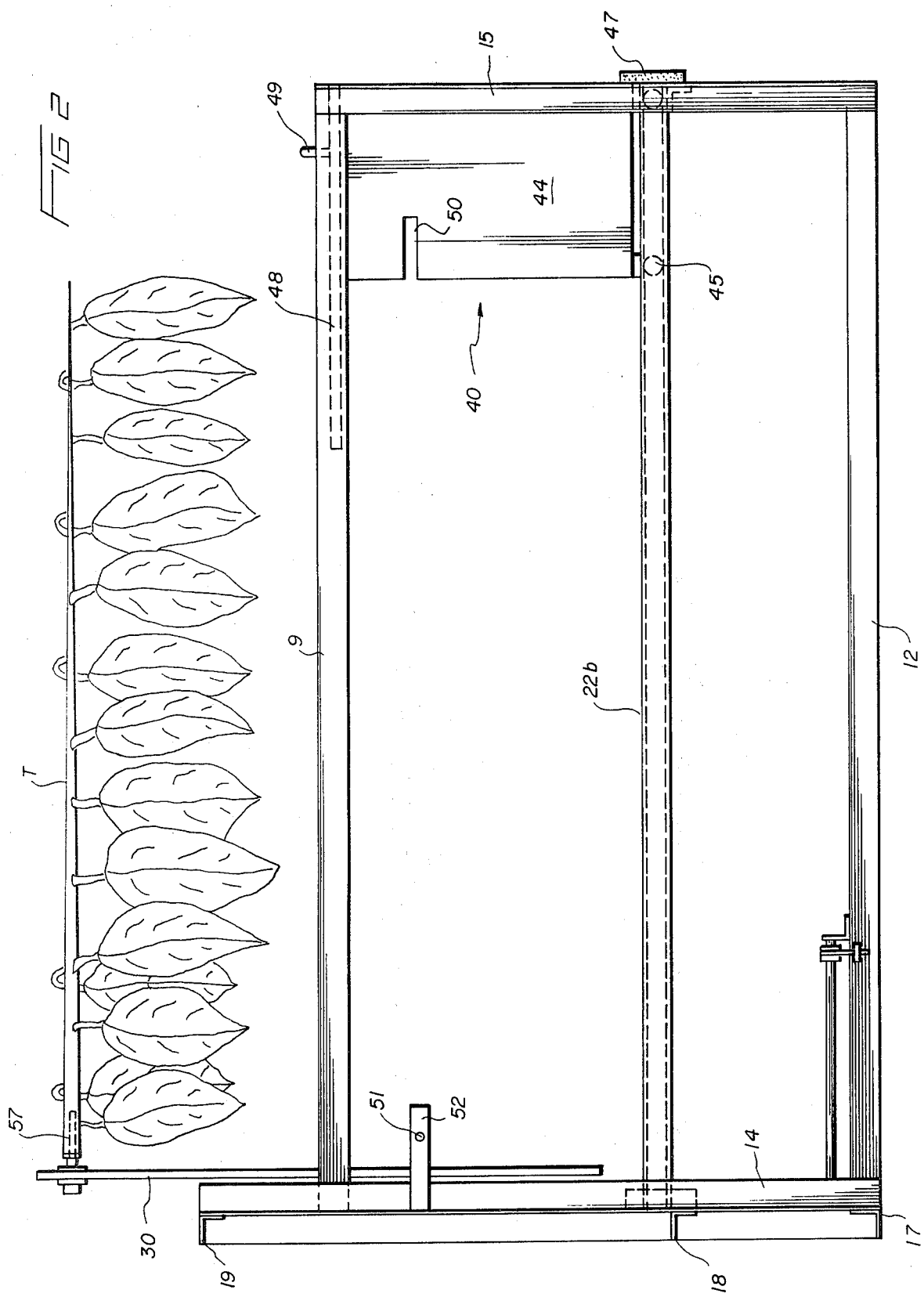
FIG. 2 is a side view of the apparatus showing a tobacco plant mounted in preparation for stripping.

The pinwheel assembly 30 is mounted to the vertical corner support member 13 of the frame 10 by a support assembly 55 which contains a hub 56 with bearings to rotatably mount the pinwheel 30. The pinwheel itself 30 is constructed from plywood or similar material and is substantially a six (or more) pointed star-shaped plate with a tine 57 projecting inwardly from each point of the pinwheel 30, so there are a total of six tines 57. Each tine is used to support and mount a tobacco stalk T as shown in FIG. 2. A detail of the tine assembly 57 is shown in FIG. 3.

Figure 3:
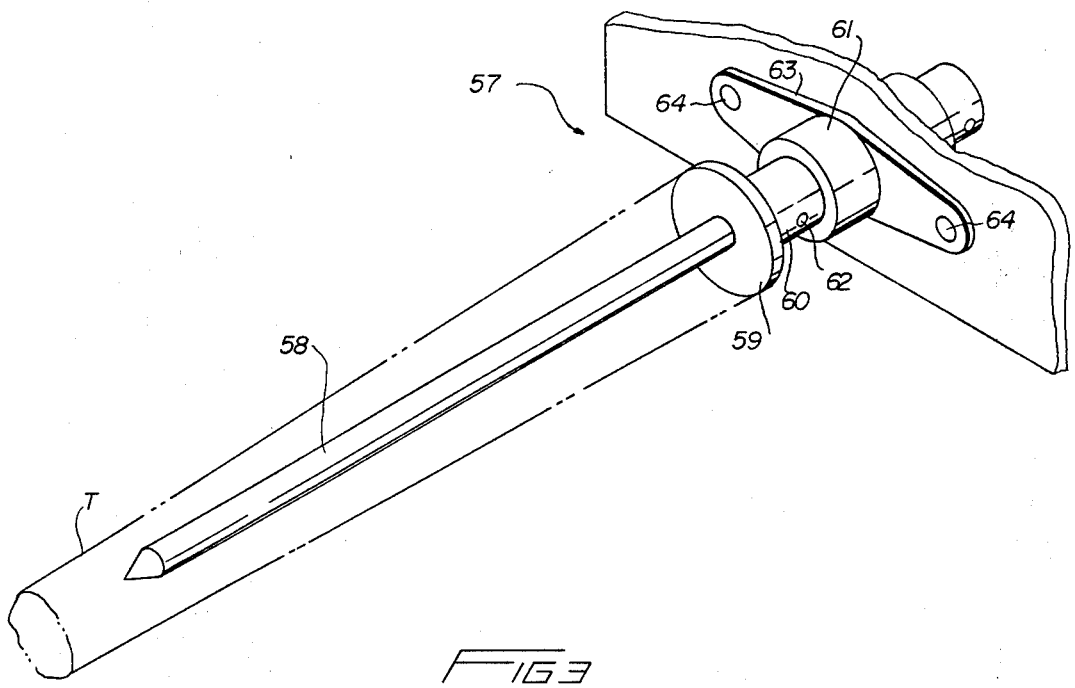
FIG. 3 is a perspective view of one of the tines contained on the pinwheel.

Referring now to FIG. 3, the tine assembly generally referred to by reference numeral 57, consists of a spike 58, a stop washer 59, an inner bearing race 60, an outer bearing race 61, oiling apertures 62 in each, and a mounting plate 63 with apertures 64 to receive mounting screws. Thus, each tine assembly 57 is mounted through a point of the pinwheel 30 so that it can rotate freely and independently of the pinwheel 30. This will allow the leaves on the tobacco plant to always hang straight down no matter what position the pinwheel 30 is in. Each point of the pinwheel is blunted and has a notch 65 which coacts with a positioning roller 66 which is contained on the positioning mechanism as shown in FIG. 4.

Figure 4:
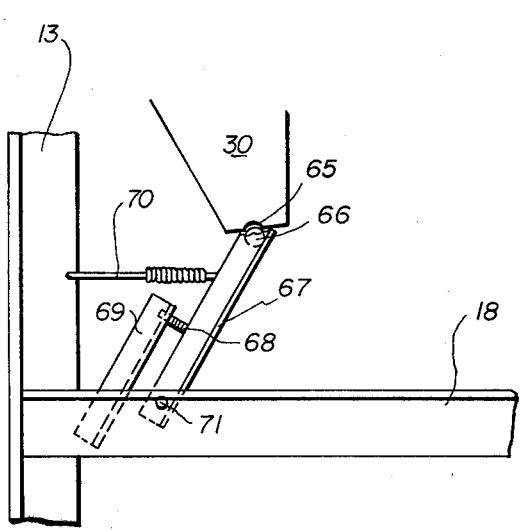
FIG. 4 is an end view of the corner of the frame detailing the positioning mechanism which engages the positioning notches on the pinwheel.

Referring now to FIG. 4, the positioning mechanism consists of a pair of arms 67 and 69, arm 67 rotatably fixed to cross-member 18 by a pin 71 and connected one to the other arm 69 by a threaded rod 68. Positioning arm 67 has a roller 66 fixed to its end in such a position that it will engage the notch 65 in the pinwheel 30. A spring 70 is attached to vertical support 13 on one end and to positioning arm 67 on the other end, so that the positioning mechanism is upwardly biased, and so that the roller 66 will engage the notch 65. Arm 69 is fixedly secured to member 18, and with threaded rod 68 adjusts the position of arm 67.

A pinwheel point backing plate 72 is welded to the vertical corner support 14 in such a position that it will support the pinwheel point from flexing under the stress of the stripping operation as shown in FIG. 1.

The pinwheel is rotated by means of a drive lever 73 which is double thick at an upper end and has a notch 74 which engages the six drive pins 75, radially disposed about the hub 56 of the pinwheel 30 on a backside thereof. The other end of the drive lever 73 is connected to a pinned clevis type joint 76 which joins a linkage arm 77. The linkage arm 77 has a notch 78 to clear frame member 11. An other end of the linkage arm 77 receives a drive shaft 79 and is mounted to frame member 17 by a mounting tab 80. The other end of the drive shaft 79 is connected to a foot pedal arm 81 which is mounted on cross-frame member 82 by a mounting tab 83. The foot pedal arm 81 has a notch 84 to clear frame member 12 and a pedal portion 85 where the operator steps in order to actuate rotation of the pinwheel 30. In operation, motion is transferred from the foot pedal arm 81 through the drive shaft 79 to the linkage arm 77 and then to the drive lever 73 which engages the drive pegs 75. A spring 86 between lever 73 and vertical support 13 biases the drive lever toward the frame member 13 in order to guarantee that the notch 74 will engage the drive peg 75. This drive mechanism working in conjunction with the positioning mechanism roller 66, properly indexes each time and the plant associated therewith orients for stripping by the stripping carriage 40.

Thus, in operation, a tobacco plant is rotated into the proper position and the stripping carriage 40 is pushed forward toward the pinwheel 30. The V-groove 48 in the top 41 of the carriage 40 engages each tobacco leaf and strips it from the stalk of the plant. When the carriage 40 reaches the end of the tracks 22a and 22b, the leaf drag bar 51 keeps the leaves properly positioned so that a person know as a swath catcher can easily remove them.

Having thus described the preferred embodiment of the invention, it should be understood that numerous structural modifications and adaptations may be resorted to without departing from the spirit of the invention. For example, a manual device has been shown, but clearly, a hydraulic, pneumatic or electric equivalent could be provided with appropriate limit switches, etc. to perform an equivalent function.

What is claimed is:

1. A device for stripping burly tobacco or the like from its associated stalk comprising, in combination:
   a frame,
   a wheel rotatably carried on said frame having means for retaining a plurality of stalks thereon,
   stripping means carried on said frame oriented to run the length of the stalk, removing tobacco therefrom,
   advancing means for moving successive tobacco stalks in registry with said stripping means,
   and indexing means for stopping said advancing means when a successive stalk is in position to be stripped.

2. The device of claim 1 wherein said stripping means includes a carriage having an open wall facing said wheel to collect the tobacco leaves therein, and means for maneuvering said carriage along the frame.

3. The device of claim 2 wherein said advancing means includes a drive lever oriented to engage drive pins disposed on said wheel, said drive lever connected to a linkage controlled by an operator.

4. The device of claim 3 wherein said indexing means comprises a roller attached to a support arm pivoted on said frame, said roller oriented to engage a notch disposed on said wheel.

5. The device of claim 4 wherein said drive lever and said support arm are each biased with a spring connected to said frame.

6. The device of claim 4 wherein said carriage is provided with a stop carried on said frame.

7. The device of claim 6 wherein said wheel comprises a star shaped pinwheel centrally supported on a hub connected to said frame, tines extending from said wheel means at extremities thereof adapted to rotatably engage a stem of the stalk.

8. The device of claim 7 wherein said carriage includes a notch on a top wall thereof oriented to engage and shear tobacco leaves from the stalk at a leaf stem, a groove on a side wall oriented to register with a leaf drag bar carried on said frame which pushes the shorn leaves into said carriage, said carriage slidably disposed on a track via wheel assemblies depending from said carriage.

9. The device of claim 8 wherein said support arm is provided with a threaded bolt which extends to a fixed arm for threaded adjustment thereof.

10. The device of claim 9 wherein said frame is formed from angle irons including a base frame, upwardly extending side webs serving to support said track, carriage and wheel, said advancing and indexing means attached thereto.

* * * * *